United States Patent
Le Noach

[11] Patent Number: 5,820,181
[45] Date of Patent: Oct. 13, 1998

[54] REMOTE MANEUVER SNAP-HOOK MAKING IT POSSIBLE TO MAKE A ROPE FAST

[76] Inventor: Gerard Le Noach, 99 allee du Pousset, 83400 Hyeres, France

[21] Appl. No.: 793,280
[22] PCT Filed: Sep. 8, 1995
[86] PCT No.: PCT/FR95/01153
 § 371 Date: Apr. 8, 1997
 § 102(e) Date: Apr. 8, 1997
[87] PCT Pub. No.: WO96/07830
 PCT Pub. Date: Mar. 14, 1996

[30] Foreign Application Priority Data

Sep. 9, 1994 [FR] France .................................. 94 10992

[51] Int. Cl.⁶ .................................................. B63B 21/54
[52] U.S. Cl. ................. 294/19.1; 294/82.19; 294/82.24; 24/599.1
[58] Field of Search ................... 394/19.1, 82.1, 394/82.19, 82.2, 82.24, 82.27, 82.33; 24/599.1, 599.4, 599.5; 114/221 R, 230

[56] References Cited

U.S. PATENT DOCUMENTS

| | | | |
|---|---|---|---|
| 653,021 | 7/1900 | Hamilton | 294/82.19 |
| 997,630 | 7/1911 | Lozenski | 24/599.1 |
| 1,545,377 | 7/1925 | Westmoreland | 24/599.1 |
| 2,349,021 | 5/1944 | Truesdale et al. | 294/82.19 |
| 2,492,991 | 1/1950 | Hanna . | |
| 3,008,210 | 11/1961 | Stovern . | |
| 3,213,508 | 10/1965 | Vigerhed | 294/82.19 |
| 3,922,028 | 11/1975 | Svennson et al. | 294/82.1 |
| 4,595,223 | 6/1986 | Hawie | 294/19.1 |

FOREIGN PATENT DOCUMENTS

| | | | |
|---|---|---|---|
| 8911 | 7/1908 | France . | |
| 87 06 660 | 7/1987 | Germany . | |
| 521468 | 3/1955 | Italy | 294/82.19 |

Primary Examiner—Dean Kramer
Attorney, Agent, or Firm—Oliff & Berridge, PLC

[57] ABSTRACT

The snap-hook (2) comprises a tilting finger (5) provided with a pivoting lever (10) intended to bear or not on the external edge of the body (4) of the snap-hook according to the position of the lever (10) with respect to the tilting finger (5), the lever (10) having a free end which projects beyond the body (4) of the snap-hook and which has an opening (14). According to the invention, the opening (14) has a rounded shape on the side of the extremity of the lever (10), and the dimensions of the opening are such that it is possible to engage the extremity of a shank for the remote displacement and actuation of the lever (10), and which is provided with a shoulder at the extremity, particularly the stud (16) which conventionally terminates a boat hook (15) used in boating, and on the other hand, provided for the pivoting of lever (10) with respect to the shank in a plane parallel to the plane of the snap-hook (2).

6 Claims, 3 Drawing Sheets

REMOTE MANEUVER SNAP-HOOK MAKING IT POSSIBLE TO MAKE A ROPE FAST

BACKGROUND OF THE INVENTION

The present invention relates to a snap-hook making it possible to secure a rope to a distant fixed point or to release this rope from this fixed point, also from a distance.

It is often necessary, especially in boating, to secure something in this way to a fixed point lying some distance away. This situation arises for example when a boat is to be made fast to an anchor buoy, to a quay equipped with rings or with railings, or to the rungs of a ladder in a lock.

It may in practice be difficult, dangerous or even impossible to get near to the fixed point in order to tie or pass the rope directly around said fixed point.

The use of snap-hooks for securing in this way is known. These snap-hooks make it easier to secure or to release the rope but still have to be manoeuvered manually in order to be opened and to be held in the open position, which means getting near to this fixed point. The aforementioned problem is therefore not solved.

American Patent U.S. Pat. No. 2,492,991 describes a snap-hook for a parachute harness. The tilting finger for closing or for opening this snap-hook comprises a lever which can pivot about an axis perpendicular to the plane of the snap-hook, which is equipped with a transverse bar capable of bearing or of not bearing on the outer edge of the body of the snap-hook depending on the position of the lever with respect to the tilting finger. When this bar comes to bear against the outer edge of the body of the snap-hook this allows the finger to be tilted into the position in which the snap-hook is partially open.

The lever on this snap-hook is intended only to be actuated manually, and not from a distance. In particular, the opening that the free end of the lever comprises serves only to allow the attachment of a tab to be grasped by hand, and is not shaped to allow the snap-hook to be transported toward a distant securing point, or to allow the lever to be manoeuvered from a distance.

This snap-hook is therefore unable to allow securing from a distance as indicated hereinabove.

Furthermore, the partial opening of this snap-hook does not in any way allow engagement over a distant securing point.

The present invention aims to overcome these drawbacks by providing a snap-hook which can be transported, engaged over the securing point and manoeuvered from a distance, this snap-hook furthermore having to remain simple and quick to use, be easy to open, even from a distance, be able to be actuated especially with a conventional boat-hook very often used in boating, and be simple to manufacture.

This snap-hook in of the type described by the aforementioned American patent, comprising a lever the free end of which projects beyond the body of the snap-hook and has an opening.

According to the invention, this opening has a rounded shape on the same side as the end of the lever and has dimensions which on the one hand allow the engagement of the end of a rod for transporting and actuating the lever from a distance, this rod being equipped at this end with a shoulder, especially the stud conventionally to be found at the end of a boat-hook used in boating and, on the other hand, allow the lever to be pivoted with respect to this rod in a plane parallel to the plane of the snap-hook.

By virtue of this opening, the lever according to the invention can be engaged over the end of the rod, especially on the aforementioned stud of a boat-hook, until it rests against said shoulder.

The pivoting of the end of the rod in the opening of the lever allows an axial thrust to be exerted on the rod and/or a pull to be exerted on the rope attached to the snap-hook in order to shift the lever and cause the finger of the snap-hook to tilt into the open position.

The rounded shape of the opening allows the lever, when it is in the pivoted position, to come to rest against either side of the end part of the rod, especially the base of the stud of a boat-hook, in a position which is at an angle with respect to this part. This resting has the effect of perfectly immobilizing the snap-hook with respect to the rod.

The rod thus allows the snap-hook together with the rope attached to it to be carried toward the distant securing point, without the risk of it escaping, and allows the snap-hook easily to be engaged, from a distance, around the securing point, owing to the absence of play between the snap-hook and the rod.

The lever returns to its original position when the rod is withdrawn, which allows the snap-hook to close.

The snap-hook may be reopened by means of the rod by engaging its end in the opening and pushing the lever, in the same way as indicated hereinabove.

The snap-hook may also be equipped with a flexible cord attached to the lever and passing through an eye formed in the body of the snap-hook. Pulling on this cord first of all allows the lever to be shifted along the body of the snap-hook in order to tilt the finger into the open position then secondly, that is to say when the lever has reached the end of its travel, allows the snap-hook to be tilted with respect to the securing point, in order to disengage it therefrom. This tilting is favoured by the curved shape exhibited by the body of the snap-hook.

Advantageously, the lever is not straight but has point of inflexion at the base of the opening so that its part delimiting the opening is offset on the side of the snap-hook attached to the rope. This point of inflexion makes it possible to increase the excursion of the lever about the end of the rod and open the snap-hook wide, which makes engagement around the securing point easier.

The lever is preferably made of metal wire of circular section, which favours the introduction of the end of the rod into the opening of the lever, for opening the snap-hook from a distance.

To make it easier to understand, the invention is described again hereinbelow with reference to the diagrammatic appended drawing which, by way of non-limiting examples represent several embodiments of the snap-hook to which it relates.

FIG. 1 represents a snap-hook 2 attached to a rope 3.

Figure 1:
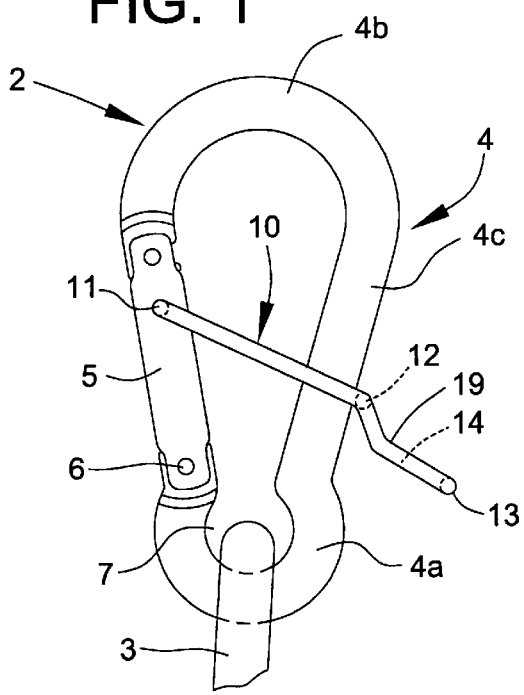
FIG. 1 is a side view thereof.

The snap-hook 2 comprises, in the conventional way, a body 4, a tilting finger 5, mounted so that it can pivot on the body 4 about a pin 6, and elastic means (not visible) for returning the finger 5 to the position shown in FIG. 1, in which the snap-hook 2 is closed.

The body 4 has an end 4a forming an eye 7 for receiving the rope, an opposite end 4b of curved shape and a portion 4c situated on the opposite side to the tilting finger 5. The latter and the portion 4c diverge from one another in the direction away from the eye 7.

Figure 2:
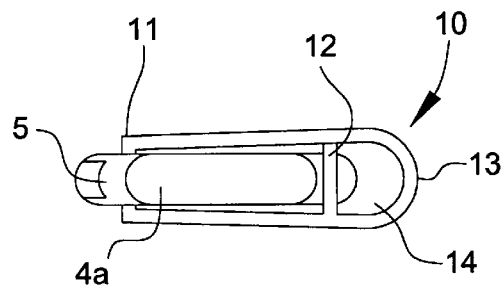
FIG. 2 is an end-on view thereof.

The snap-hook 2 is also equipped with a lever 10, visible from two different angles in FIGS. 1 and 2.

This lever 10 is made of metal wire of circular section with a diameter of the order of 1 or 2 millimeters. It is mounted so that it can pivot on the tilting finger 5 about a pin 11 parallel to the pin 6 and has a transverse bar 12 intended to bear against the part 4c of the body 4, and a free end 13 projecting beyond the body 4 of the snap-hook 2.

The free end 13 has an opening 14 with rounded shape on the same side as the end of the lever 10, as is seen in FIG. 2.

The lever 10 is not straight but has a point of inflexion 19 at the base of the opening 14 so that its part delimiting the opening 14 is offset on the side of the snap-hook 2 attached to the rope 3.

Figure 3:
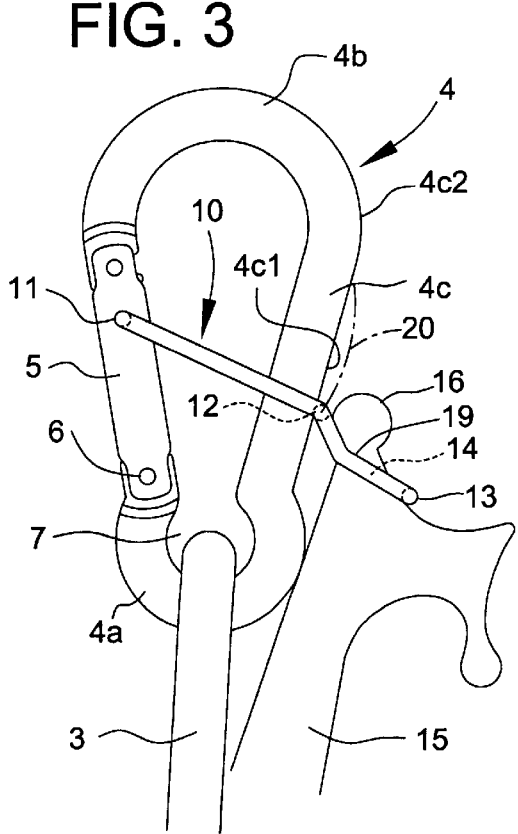
FIGS. 3 and 4 are views during operation in two different positions.
Figure 4:
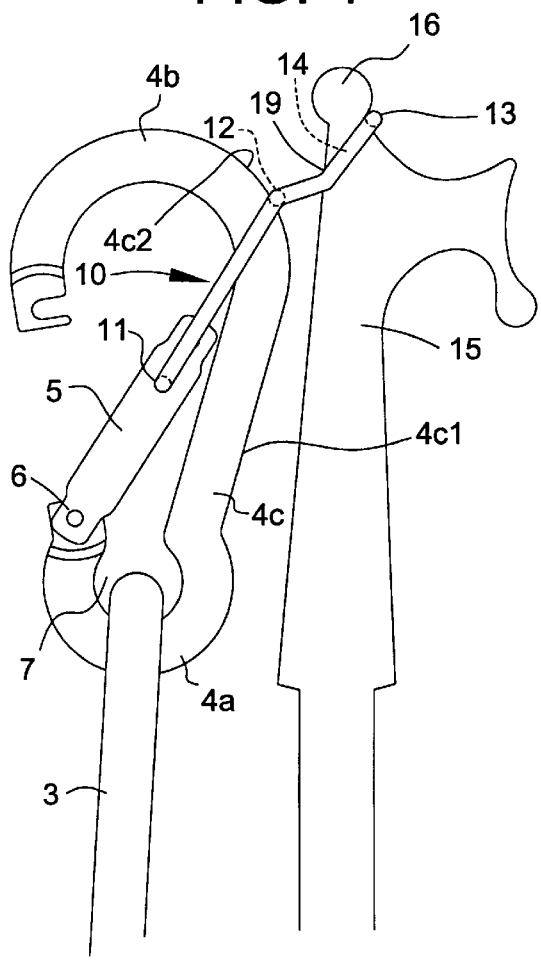

FIGS. 3 and 4 show the snap-hook 2 and the lever 10 as well as a conventional boat-hook 15 commonly caused in boating.

It may be seen by comparing these figures that the end stud 16 of the boat-hook 15 can be engaged through the opening 14 and that the lever 10 can pivot therein with respect to this stud 16 in a plane parallel to the plane of the snap-hook 2.

This engagement and this pivoting allow the snap-hook 2 to be hooked onto the boat-hook 15 and an axial thrust to be exerted on the boat-hook 15 and/or a pull to be exerted on the rope 3 in order to shift the lever 10. As the bar 12 moves from the portion 4c1 to the portion 4c2 situated beyond the circular arc 20, this makes the finger 5 tilt into the open position. The more steeply the portion 4c of the body 4 deviates from said circular arc 20, the more rapid this tilting will be, and this is the situation with the snap-hook 2, of which the tilting finger 5 and the portion 4c diverge from one another away from the eye 7.

The rounded shape of the opening allows the lever 10, when it is in the pivoted position, to come to rest against either side of the base of the stud 16, in a position which is at an angle with respect to this stud. This resting has the effect of perfectly immobilizing the snap-hook 2 with respect to the boat-hook 15.

The boat-hook 15 thus allows the snap-hook 2 together with the rope 3 attached to it to be carried toward the distant securing point, without the risk of it escaping, and allows the snap-hook 2 easily to be engaged, from a distance, around the securing point, owing to the absence of play between the snap-hook 2 and the boat-hook 15.

Figure 5:
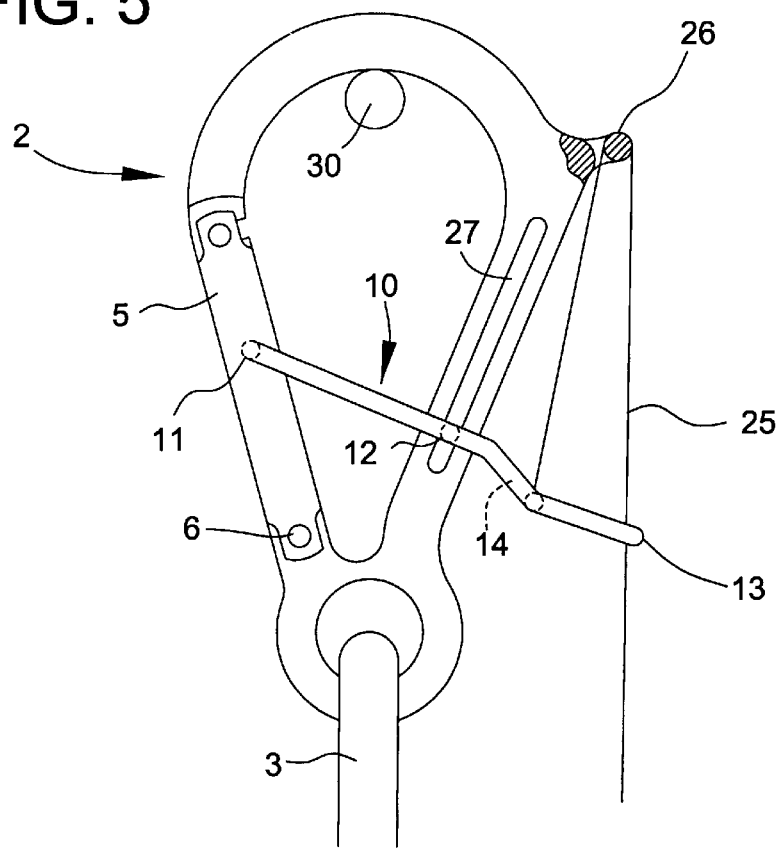
FIG. 5 is a side view thereof according to an alternative form, in a first position.
Figure 6:
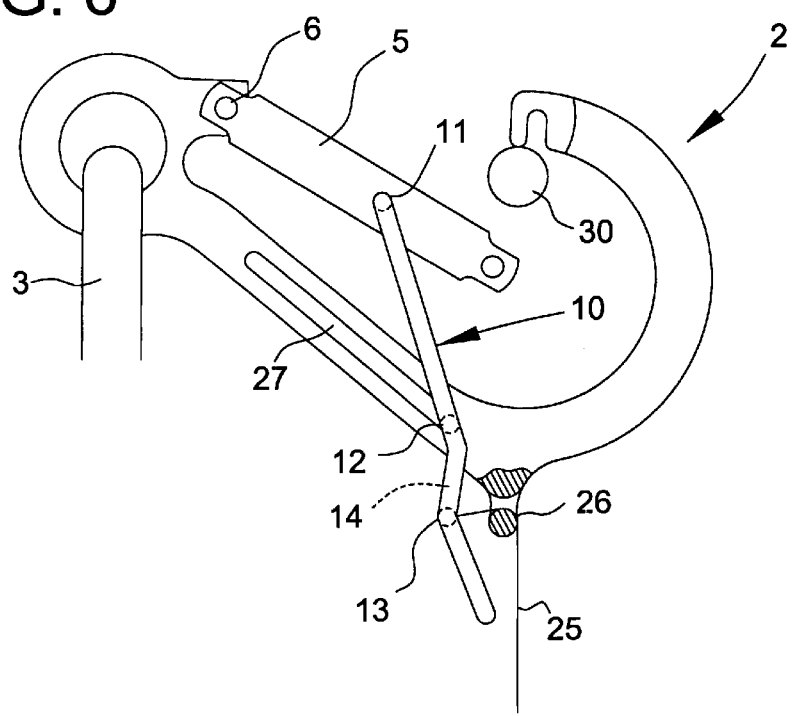
FIG. 6 is a view thereof similar to FIG. 5, in a second position.

FIGS. 5 and 6 show that the free end 13 of the lever 10 can be attached to a flexible cord 25 passing through an eye 26 situated substantially level with the free end of the tilting finger 5 on the opposite side thereto. Pulling on this cord 25 first of all allows the lever 10 to be shifted along the body of the snap-hook 2 in order to tilt the finger 5 into the open position in the way described hereinabove then secondly, that is to say when the lever 10 has reached the end of its travel and is close to said eye 26, allows the snap-hook 2 to be tilted with respect to the securing point 30 over which it is engaged. This tilting is favoured by the curved shape exhibited by the portion 4b of the body 4.

It goes without saying that the invention is not limited to the embodiment described hereinabove by way of example but that it encompasses all alternative forms thereof.

Thus, the transverse bar 12 may slide not over the outer edge of the portion 4c of the body 4 but inside a longitudinal slot 27 formed therein.

Figure 7:
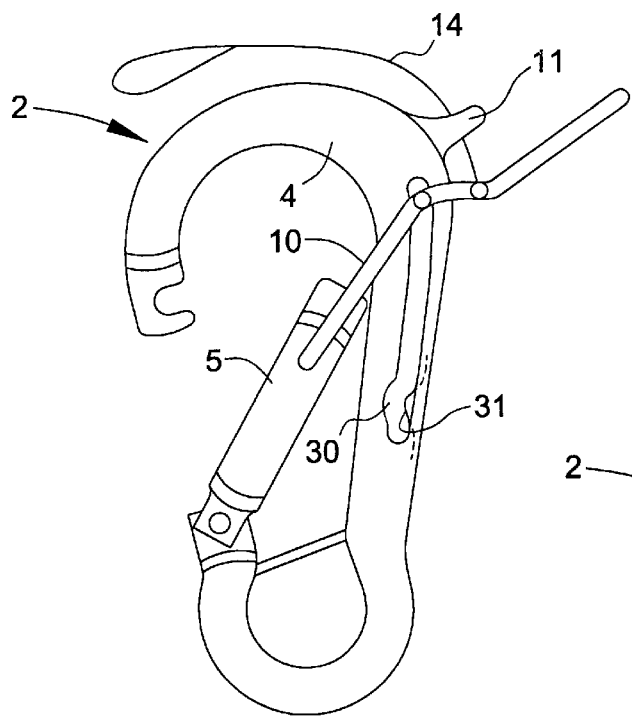
FIGS. 7 to 9 are views thereof according to three other alternative forms.
Figure 8:
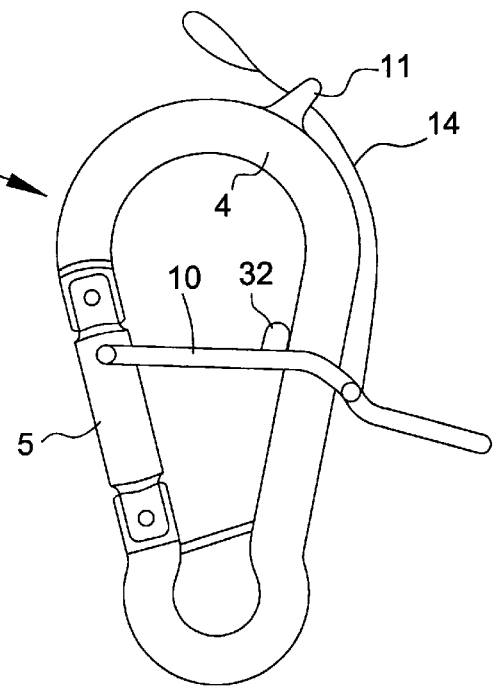
Figure 9:
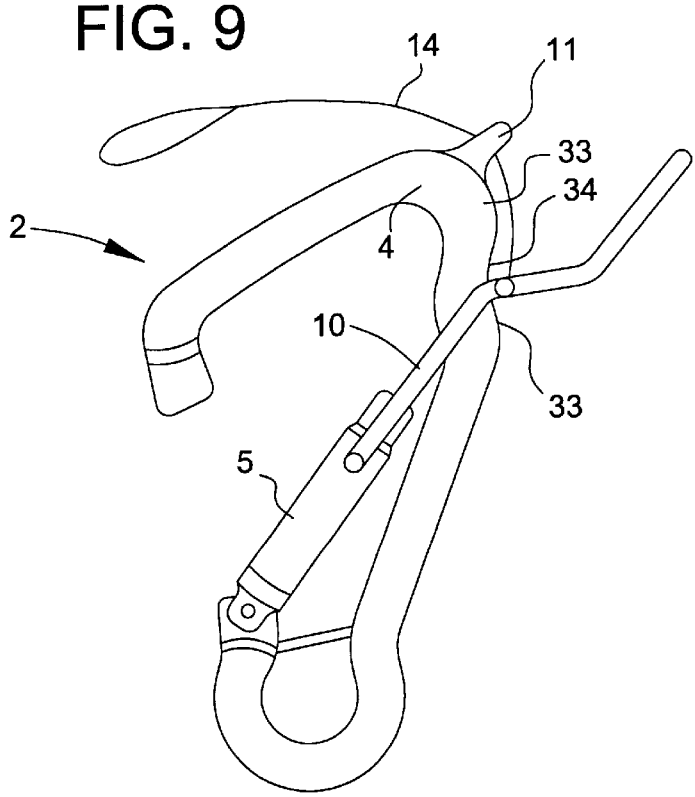

FIGS. 7, 8 and 9 show that the snap-hook may comprise means for holding the lever 10 in the position in which the snap-hook 2 is closed or open, namely, respectively, a notch 30 and a spring 31, an internal transverse bar 32 of curved shape allowing the lever 10 to be jammed in the closed position, or a double point of inflexion 33 of the body 4 delimiting an external recess 34 for holding the lever 10 in the open position.

Furthermore, the snap-hook according to the invention may be used in fields other than boating, and be manoeuvered by any type of rod having a shoulder at one 30 end.

What is claimed is:

1. A snap-hook for use with a rod, the snap-hook making it possible to secure a rope to a distant fixed point or to release this rope from this fixed point, also from a distance, comprising:

a tilting finger equipped with a pivoting lever capable of bearing or of not bearing on an outer edge of a body of the snap-hook depending on the position of the lever with respect to the tilting finger, the lever pivoting with respect to the tilting finger and to the body, and having a free end which projects beyond the body of the snap-hook, the free end having an opening, the snap-hook being characterized in that the opening has a rounded shape on the same side as the free end of the lever and has dimensions which on the one hand allow the engagement of an end of the rod for transporting and actuating the lever from a distance, the rod being equipped at the end with a shoulder having a stud, the stud conventionally to be found at the end of a boat-hook used in boating and, on the other hand, allow the lever to be pivoted with respect to this rod in a plane parallel to the plane of the snap-hook.

2. Snap-hook according to claim 1, characterized in that the lever has a point of inflexion at the base of the opening so that a part delimiting the opening is offset on the side of the snap-hook attached to the rope.

3. Snap-hook according to claim 1, characterized in that the lever is made of metal wire of circular section.

4. Snap-hook according to claim 1, further comprising a flexible cord attached to the lever and passing through an eye formed in the body.

5. Snap-hook according to claim 1, characterized in that a transverse bar of the lever which comes to bear against the body is engaged inside a longitudinal slot formed in the portion of the body.

6. Snap-hook according to claim 1 further comprising means for keeping the lever in the position in which the snap-hook is closed or open, the means comprising one of:

a notch and a spring, an internal transverse bar of curved shape, allowing the lever to be jammed in the closed position, and a double point of inflexion of the body delimiting an external cavity for keeping the lever in the open position.

* * * * *